United States Patent
Korus (10) Patent No.: US 9,538,712 B2
(45) Date of Patent: Jan. 10, 2017

(54) TOWER ALIGNMENT SYSTEM AND MECHANISM THAT ALLOWS PROGRAMMED CHANGES TO THE ALIGNMENT AUTOMATICALLY

(75) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 1145 days.

(21) Appl. No.: 13/431,137

(22) Filed: Mar. 27, 2012

(65) Prior Publication Data

US 2012/0305682 A1 Dec. 6, 2012

Related U.S. Application Data

(60) Provisional application No. 61/492,124, filed on Jun. 1, 2011.

(51) Int. Cl.
*B05B 3/18* (2006.01)
*A01G 25/09* (2006.01)

(52) U.S. Cl.
CPC ........... *A01G 25/092* (2013.01); *A01G 25/095* (2013.01); *A01G 25/097* (2013.01)

(58) Field of Classification Search
CPC ... A01G 25/092; A01G 25/095; A01G 25/097
USPC ................................. 239/731, 733; 403/102
See application file for complete search history.

(56) References Cited

U.S. PATENT DOCUMENTS

| | | | | |
|---|---|---|---|---|
| 3,807,436 A * | 4/1974 | Pringle | ................ | A01G 25/092 239/731 |
| 4,176,676 A * | 12/1979 | Townsend | ............ | A01G 25/092 239/728 |
| 4,434,936 A * | 3/1984 | Chapman | .................. | B05B 3/18 239/731 |
| 2003/0066912 A1* | 4/2003 | Krieger | ................ | A01G 25/092 239/731 |
| 2007/0162209 A1* | 7/2007 | Gallaun | ............... | A01G 25/092 701/50 |

\* cited by examiner

*Primary Examiner* — Arthur O Hall
*Assistant Examiner* — Joel Zhou
(74) *Attorney, Agent, or Firm* — Hovey Williams LLP (57) ABSTRACT

An alignment unit for use with an irrigation system comprises a housing, an alignment sensor, an alignment controller, and an actuator. The irrigation system may include a plurality of spans, each including a drive tower and a drive unit. The housing may house at least a portion of the alignment unit. The alignment sensor may measure a real-time alignment of the drive tower. The alignment controller may be in communication with the alignment sensor and may be operable to receive the real-time alignment of the drive tower and energize the drive unit based on a first range of real-time alignment values. The actuator may couple with the alignment controller and may reorient at least a portion of the alignment controller in relation to the alignment sensor.

6 Claims, 10 Drawing Sheets

TOWER ALIGNMENT SYSTEM AND MECHANISM THAT ALLOWS PROGRAMMED CHANGES TO THE ALIGNMENT AUTOMATICALLY

CROSS REFERENCE TO RELATED APPLICATION

This non-provisional patent application claims priority to U.S. Provisional Patent Application No. 61/492,124 filed on Jun. 1, 2011, the entire contents of which is herein incorporated by reference in its entirety.

BACKGROUND OF THE INVENTION

Field of the Invention

Embodiments of the present invention relate to control systems for irrigation systems. More particularly, embodiments of the present invention relate to control systems to guide irrigation systems with elevated irrigation pipelines in an automated and continued manner while reconfiguring alignment of the pipelines in various configurations.

Description of the Related Art

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

Common irrigation systems include center-pivot systems and lateral-move systems, each having an elevated, elongated pipe supported by a plurality of drive towers spaced along the pipe. The pipe includes a plurality of spaced sprinklers that may extend downward toward the crops to enable distribution of water to the crops from above. Center-pivot systems are ideal for use in fields having circular crop areas and generally include a hydrant located in the middle of each circular crop area. In such systems, a plurality of spans are linked together radially outward from the hydrant. Each span includes a tower and a truss assembly that supports the pipe and the sprinklers which deliver water to the crop area while the spans rotate about the hydrant. Lateral-move systems are ideal for use in square, rectangular, and irregular-shaped fields. Such systems generally include one or more hydrants located in and/or adjacent to a field and/or one or more ditches located along or through a field that are connected to the pipe and the sprinklers. Unlike the center-pivot system having a pipe with a stationary end, the pipe in a lateral-move system is connected to and extends from a movable cart designed to traverse up and down a cart path. The pipe may be locked at an angle perpendicular to the cart path and pivot at an end at the cart path, which is desirable if the cart path extends down the middle of a field to enable pivoting from one side of the cart path to the other with each pass along the cart path.

In both center-pivot and lateral move systems, each span is long, for example, one hundred thirty five feet and two hundred feet. To move the span during an irrigation operation, each of the drive towers includes two or more wheels that are fixed in orientation and driven by a mechanical drive unit. The mechanical drive units may be a series of electric motors or other similar sources of propulsion. In general, the mechanical drive units propel the span forward or backward in a circular or lateral pattern along a field and over crops, to provide crop irrigation.

While the spans are being driven, it may be desirable to automatically reconfigure an alignment of the irrigation system. For instance, it may be desirable to reconfigure the alignment of one or more spans to relieve stress in the pipe caused by an uneven grade or to cause one or more spans to wrap or swing around obstacles in a path of the system.

SUMMARY OF THE INVENTION

Embodiments of the present invention provide an irrigation control system and method that automatically reconfigures an alignment of an irrigation pipeline to accommodate dynamic irrigation patterns that, for instance, allows irrigation beyond a single plane and/or around obstacles, and to relieve stress in the pipeline, thereby decreasing a likelihood of kinking or bursting of the pipeline.

In a first embodiment, the present invention includes an alignment unit for use with an irrigation system that includes a plurality of spans, each including a drive tower and a drive unit. The alignment unit may broadly comprise a housing, an alignment sensor, an alignment controller, and an actuator. The housing may house at least a portion of the alignment unit. The alignment sensor may measure a real-time alignment of the drive tower. The alignment controller may be in communication with the alignment sensor and may be operable to receive the real-time alignment of the drive tower and energize the drive unit based on a first range of real-time alignment values. The actuator may couple with the alignment controller and may reorient at least a portion of the alignment controller in relation to the alignment sensor.

The alignment controller, in a first embodiment, may include a cam and a control switch. The cam may be coupled to the alignment sensor which rotates in response to changes in the real-time alignment and may include a control notch and a safety notch. The control switch may include a roller in contact with the cam such that when the roller contacts the control notch the drive unit is deenergized and when the roller does not contact the control notch the drive unit is energized. The alignment unit may also include a safety switch that includes a roller coupled to the cam such that when the roller does not contact the safety notch the drive unit is deenergized.

A second embodiment of the alignment controller may include a variable control unit in communication with the alignment sensor that is operable to receive the real-time alignment of the drive tower and control the speed of the drive unit. The variable control unit may include a shaft coupled to the alignment sensor and a body operable to be rotated by the actuator.

In a second embodiment, the present invention includes an irrigation system comprising a plurality of spans and a controller. Each span may include a drive tower, a drive unit, an antenna, and an alignment unit. The drive tower may support a fluid-carrying pipeline. The drive unit may propel the drive tower. The antenna may communicate a geographic position of the span. The alignment unit may engage the drive unit to bring the span into a default setting of alignment with at least one other span. The controller may receive data from each antenna regarding the position of each span and may be configured to send a signal to each alignment unit to change the default setting based on the position of the span. The alignment unit may also include features as discussed above.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
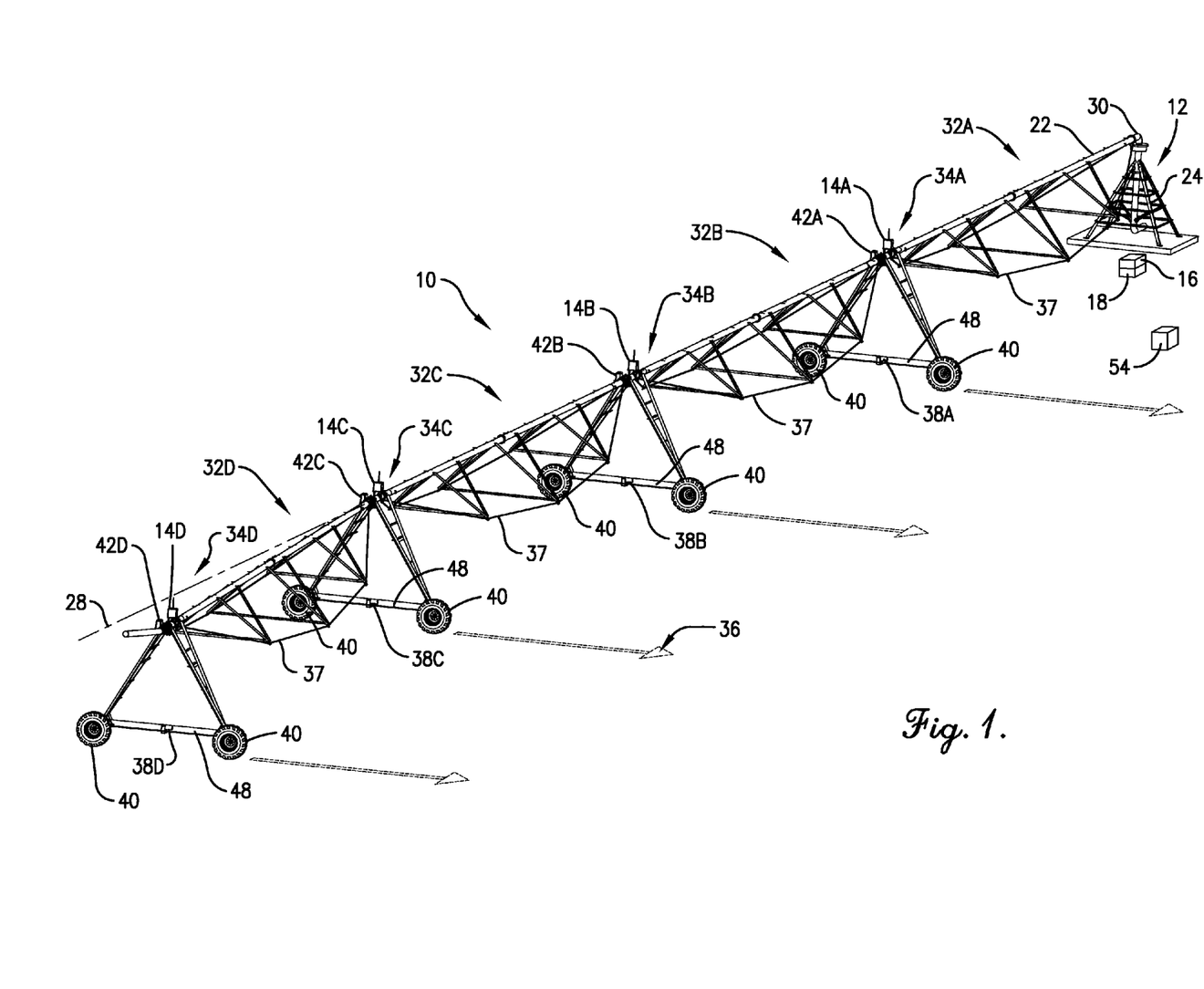
FIG. 1 is a perspective view of an irrigation system on which the guidance control system of the present invention may be implemented.
Figure 2:
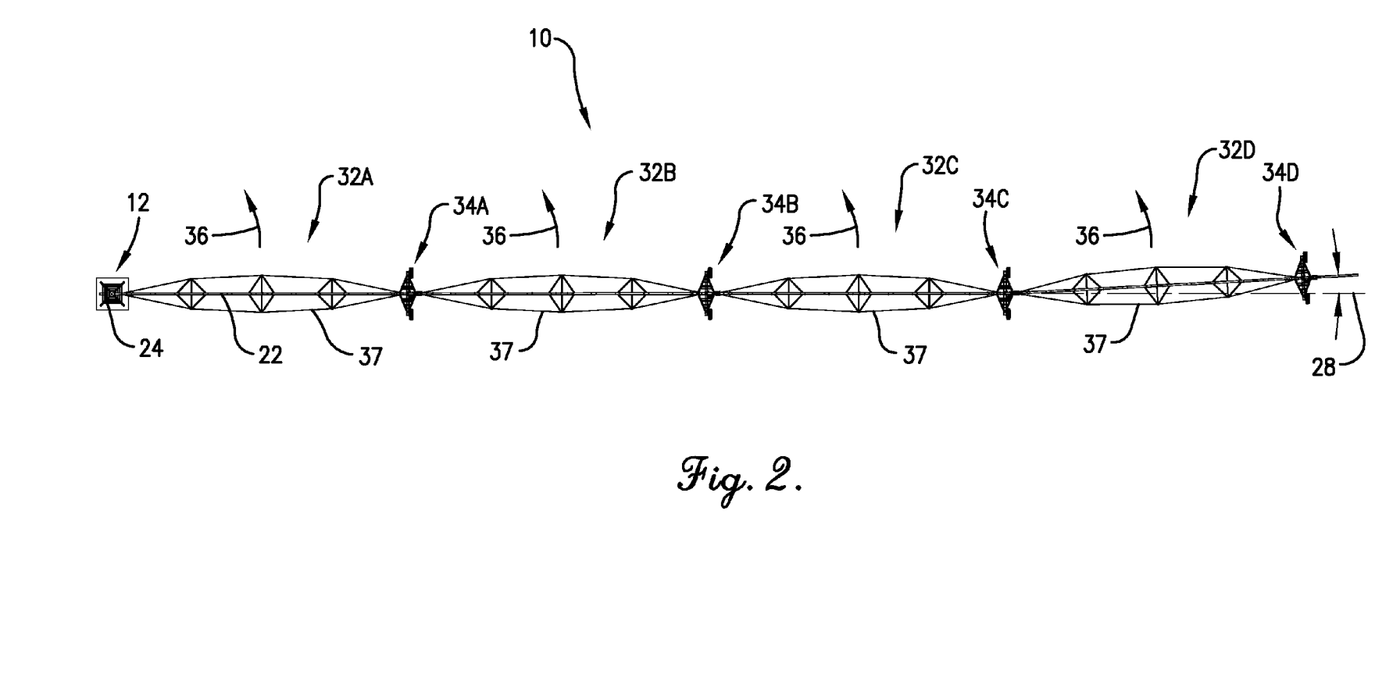
FIG. 2 is a top plan view of the irrigation system of FIG. 1, illustrating one of the drive towers leading a horizontal plane defined by the guidance control system.
Figure 3:
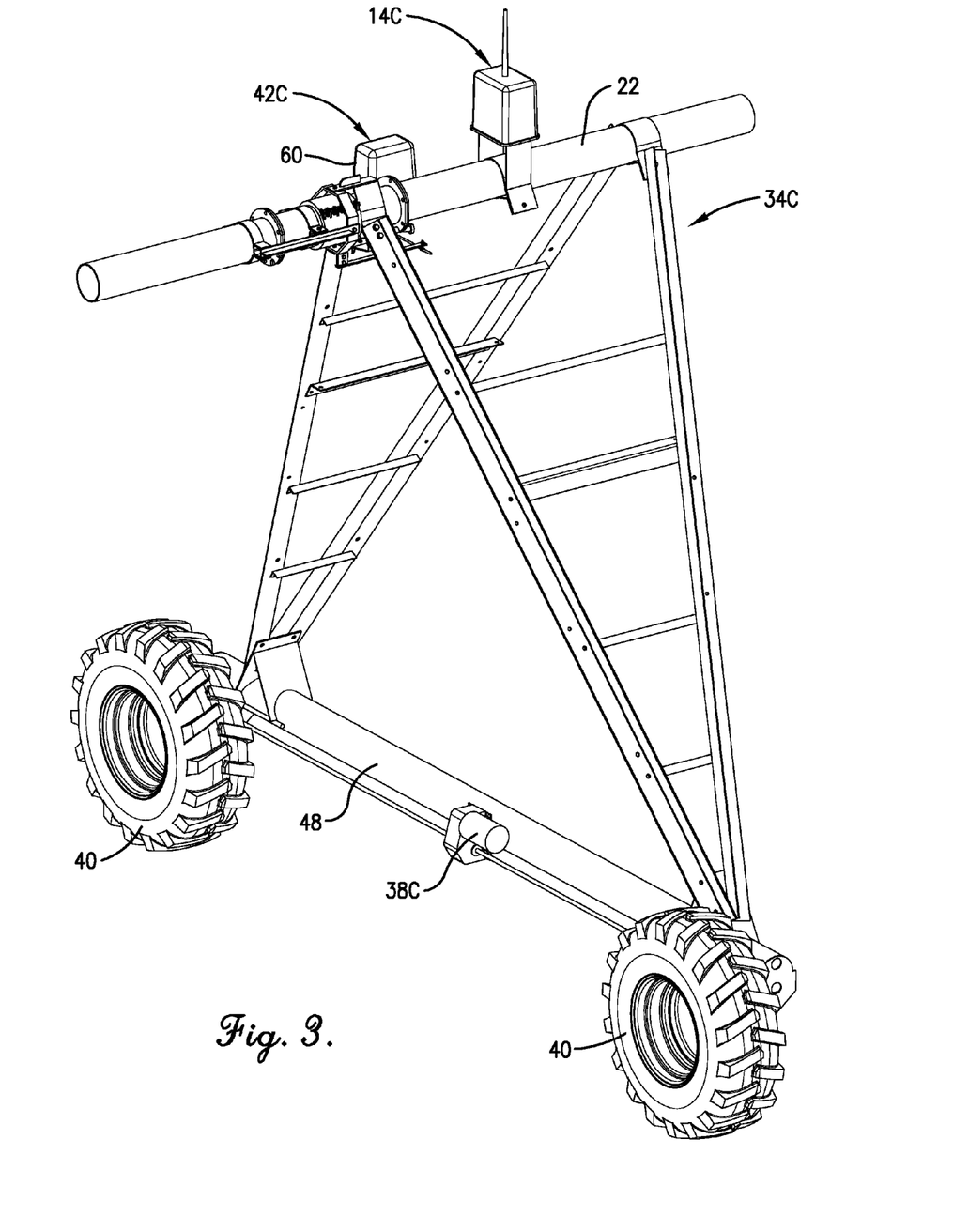
FIG. 3 is a perspective view of the irrigation system of FIG. 1, illustrating one of the drive towers.
Figure 4:
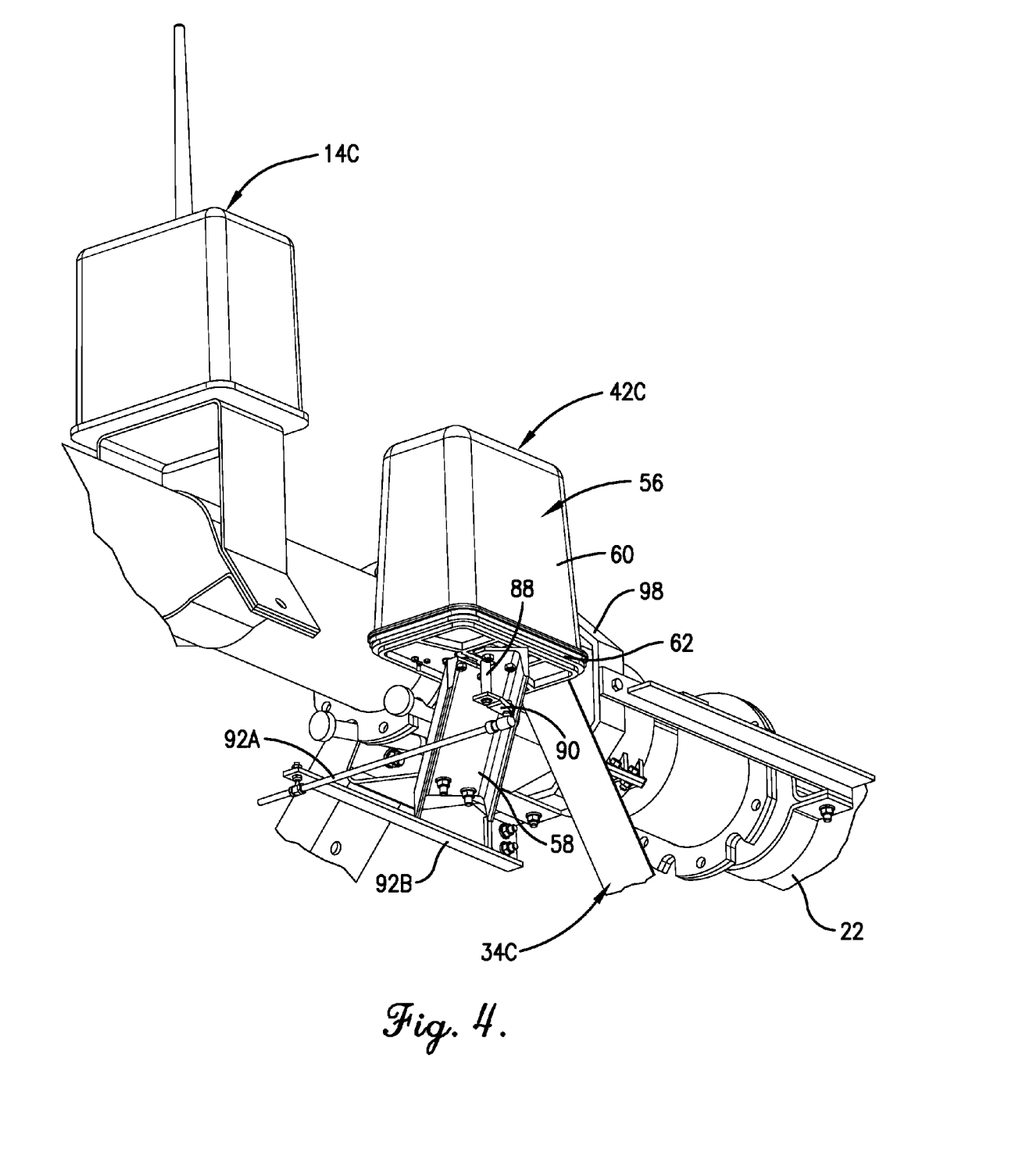
FIG. 4 is a magnified perspective view of the irrigation system of FIG. 1, illustrating a portion of one of the drive towers.

Turning to FIGS. 1-3, a guidance control system 10 constructed in accordance with various embodiments of the present invention is shown on a portion of an irrigation system 12. An example of a complete irrigation system is shown and described in more detail in U.S. patent application Ser. No. 13/042,192 filed Mar. 7, 2011, which is hereby incorporated into the present application by reference in its entirety. The guidance control system 10 broadly includes a plurality of antennas 14A, 14B, 14C, 14D, a receiver 16, and a controller 18.

The irrigation system 12 is generally utilized to irrigate crops or other farmland areas and includes an elevated linear pipeline 22 extending from a center-pivot system with support tower 24 that connects the pipeline 22 to a fluid source. The fluid source may be a tank, a well, or a similar source that has a fixed, remote location with respect to the pipeline 22. The system 10 is illustrated with the center-pivot system with support tower 24 for illustrative purposes only and may be configured with other types of supports without deviating from the scope of the present invention. For example, the irrigation system 12 may be configured with a lateral-move cart with support tower instead of the center-pivot system with support tower 24. An example of a lateral-move cart is shown and described in more detail in U.S. Patent Publication No. 2010/0274398 filed Apr. 28, 2009, which is hereby incorporated into the present application by reference in its entirety.

The pipeline 22 extends along a centerline horizontal axis 28 when the pipeline 22 is in a perfectly straight configuration. The horizontal axis 28 is defined by an elbow joint 30 of the center-pivot system with support tower 24. The pipeline 22 includes a plurality of fluid-spraying sprinklers affixed to the pipeline 22 along a length thereof to deliver fluid to an irrigation area, such as crops and fields, during an irrigation operation. The elbow joint 30 rotatably couples the pipeline 22 to the center-pivot system with support tower 24. The irrigation system 12 may include a plurality of spans 32A, 32B, 32C, 32D linked together in series and connected to the support tower 24 at the elbow joint 30. Although the irrigation system 12 is illustrated with four spans 32A, 32B, 32C, 32D, the irrigation system 12 may have any number of spans 32A, 32B, 32C, 32D without deviating from the scope of the present invention and preferably has at least two spans.

In various embodiments, the irrigation system 12 may include two types of spans 32—a lead span 32D, and one or more lag spans 32A, 32B, 32C. The lead span 32D is typically the outermost positioned span 32, while the lag spans 32A, 32B, 32C are the innermost spans, which are positioned between the lead span 32D and the support tower 24. In such embodiments, the alignment unit 42D for the lead span 32D may not be necessary and may be omitted. It is also possible for the irrigation system 12 to include more than one lead span, particularly when the system 12 includes a large number of spans, such as twenty or more. The lead spans may be evenly distributed along the irrigation system 12, with a plurality of lag spans positioned in between.

The spans 32A, 32B, 32C, 32D of the irrigation system 12 are substantially identical to each other and respectively include moveable drive towers 34A, 34B, 34C, 34D that cooperatively support the spans 32A, 32B, 32C, 32D in an elevated position. Each of the drive towers 34A, 34B, 34C, 34D includes a structural framework 37 to increase the structural integrity of the spans 32A, 32B, 32C, 32D, a mechanical drive unit 38A, 38B, 38C, 38D, a wheel and tire assembly 40A, 40B, 40C, 40D on either end of the drive unit 38, and an alignment unit 42A, 42B, 42C, 42D, also known as a tower panel. The drive towers 34A, 34B, 34C, 34D are operable to independently drive the spans 32A, 32B, 32C, 32D along a generally circular path 36 around the center-pivot system with support tower 24.

Each of the drive units 38 is mounted to a lateral bar 48 of the drive towers 34A, 34B, 34C, 34D that extends substantially perpendicular to the horizontal axis 28, and includes an electric motor operable to drive the plurality of wheel and tire assemblies 40. The motor may include direct current (DC) or alternating current (AC) motors. In various embodiments, the motor may include a variable-frequency drive (VFD) motor. The motor may have a single output speed or a variable output speed. The drive units 38 are each operable to independently communicate with the controller 18 of the guidance control system 10 so that the controller 18 is operable to independently control each of the drive units 38. The drive units 38 may include linkages, gears, gear boxes, batteries, and other components and communication equipment to allow the wheel and tire assemblies 40 to be driven or rotated in at least a forward direction and a reverse direction along the path 36 as controlled by the controller 18.

In embodiments that include the lead span 32D and lag spans 32A, 32B, 32C, the lead span 32D may be driven according to the amount of water that is to be delivered to the irrigation area. For example, the lead span 32D may be driven as a time-based percentage of the maximum amount of water that the irrigation system 12 can deliver. If the irrigation system 12 is required to deliver half of the maximum capacity, then the lead span 32D may driven for 30 seconds every minute. For the other 30 seconds, the lead span 32D is not driven and stands still. If the irrigation system 12 is required to deliver 75% of maximum capacity, for example, then the lead span 32D may driven for 45 seconds every minute. For the other 15 seconds, the lead span 32D is not driven and stands still. The lag spans 32A, 32B, 32C are then driven as necessary, described below, in order to bring them into alignment.

The wheel and tire assemblies 40 are mounted to and spaced from each other along the lateral bar 48 in a fixed orientation to generally define a direction of travel of the wheel and tire assemblies 40 along the path 36. The drive units 38 and the wheel and tire assemblies 40 cooperatively permit independent movement of each of the drive towers 34A, 34B, 34C, 34D along the path 36 at equal or variable speeds relative to each other, as determined by the controller 18.

Each one of the plurality of antennas 14A, 14B, 14C, 14D of the guidance control system 10 is rigidly coupled to one span 32A, 32B, 32C, 32D along the irrigation system 12. When the spans 32 is in the straight configuration, the plurality of antennas 14A, 14B, 14C, 14D extend along the horizontal axis 28 defined by the elbow joint 30 of the center-pivot system with support tower 24. It is foreseen, however, that each of the 14A, 14B, 14C, 14D may be positioned at a known fixed distance offset to the horizontal axis 28, for instance, on another part of the irrigation system 12, without deviating from the scope of the present invention.

Each of the plurality of antennas 14A, 14B, 14C, 14D extends in an upward direction that is roughly perpendicular to the path 36. Thus, the longitudinal axis of each of the plurality of antennas 14A, 14B, 14C, 14D always maintains a right angle relative to the direction of travel of the wheel and tire assemblies 40. In the exemplary embodiment, the plurality of antennas 14A, 14B, 14C, 14D cooperatively operate as a network with each of the plurality of antennas 14A, 14B, 14C, 14D corresponding to one of the spans 32A, 32B, 32C, 32D. It is foreseen, however, that the guidance control system 10 may utilize any number of antennas and as few as a single antenna without deviating from the scope of the present invention.

Each of the plurality of antennas 14A, 14B, 14C, 14D is operable to independently receive a signal containing positional information from a GPS source, such as the Global Positioning System satellite navigation system, one or more satellite sources, and/or one or more terrestrial sources. The positional information relates to a position of one or more of the plurality of antennas 14A, 14B, 14C, 14D, such as latitude and/or longitude coordinates of one or more of the plurality of antennas 14A, 14B, 14C, 14D as well as heading and altitude information of one or more of the plurality of antennas 14A, 14B, 14C, 14D. The positional information may be received in a continuous, real-time fashion as is typically determined and controlled by the external systems such as the Global Positioning System and an RTK or similar system. Each of the plurality of antennas 14A, 14B, 14C, 14D is operable to communicate the signals to the receiver 16 as they are received. It is foreseen that the guidance control system 10 may operate with as few as one of the plurality of antennas 14A, 14B, 14C, 14D. For example, antennas 14A, 14B may be removed at the spans 32A, 32B without deviating from the scope of the present invention.

Each of the plurality of antennas 14A, 14B, 14C, 14D may also receive another signal from a correction source or secondary fixed GPS unit 54, which provides a Real Time Kinematic (RTK) system with correction information about the positional information received by each of the plurality of antennas 14A, 14B, 14C, 14D to increase the accuracy of the positional information. With the correction information, the position of the spans 32 along the path 36 may be determined to within a few centimeters or less. The correction source 54 may be terrestrial-based and may include a dedicated or shared RTK base station plus radios (900 MHz ISM spread spectrum or licensed at approximately 450 MHz) or a public or commercial virtual reference station plus cellular or radio connections, or may be satellite-based such as OmniSTAR® with compatible receiving components. The correction source 54 is located in the path 36 in the exemplary embodiment, but may be located at any known distance that enables communication between the correction source 54 and the antenna 14.

The receiver 16 of the guidance control system 10 is located in a fixed location that is remote from the plurality of antennas 14A, 14B, 14C, 14D. It is foreseen, however, that the receiver 16 may be located anywhere, for example, on the irrigation system 12, provided that the receiver 16 is operable to communicate with the plurality of antennas 14A, 14B, 14C, 14D. The receiver 16 may include crystal oscillators and signal amplifiers as well as other components as are known in the art. The receiver 16 is operable to wirelessly receive each of the signals from the plurality of antennas 14A, 14B, 14C, 14D and independently output the signals to the controller 18. It is foreseen that the receiver 16 may perform one or more processing operations on signals received. In the exemplary embodiment, the receiver 16 assigns a unique identifier to each of the signals received to enable identification of the source from which each of the signals was received, that is, from which of the plurality of antennas 14A, 14B, 14C, 14D.

The controller 18 of the guidance control system 10 is located in a fixed location that is remote from the plurality of antennas 14A, 14B, 14C, 14D and is preferably adjacently located to the receiver 16 and wired thereto for communication therewith. It is foreseen, however, that the controller 18 may be located anywhere, for example, secured to the irrigation system 12, provided that the controller 18 is operable to communicate with the receiver 16, for instance, wirelessly.

The controller 18 is operable to receive and further process the information transmitted from the receiver 16 to determine various factors related to each of the plurality of antennas 14A, 14B, 14C, 14D. For instance, the factors determinable by the controller 18 based on the information may be the latitude and/or longitude coordinates of one or more of the plurality of antennas 14A, 14B, 14C, 14D as well as heading and altitude information of one or more of the plurality of antennas 14A, 14B, 14C, 14D, terrain, slope or grade of the path 36, and/or obstacles in or adjacent to the path 36. The controller 18 may then compare the factors of each of the plurality of antennas 14A, 14B, 14C, 14D to determine whether the spans 32A, 32B, 32C, 32D and/or the drive towers 34A, 34B, 34C, 34D are properly configured relative to each other, the horizontal axis 28, and/or the current location of the drive towers 34A, 34B, 34C, 34D along the path 36. It is foreseen that it will be generally desirable to maintain alignment of the drive towers 34A, 34B, 34C, 34D with respect to each other and/or the horizontal axis 28 in most applications. In some applications, however, it may be desirable to reconfigure the drive towers 34A, 34B, 34C, 34D in a misaligned configuration relative to each other and/or the horizontal axis 28. For instance, when the drive towers 34A, 34B, 34C, 34D are traveling over uneven ground, it may be desirable to misalign one or more of the spans 32A, 32B, 32C, 32D to relieve stress on the irrigation system 12. Further, it may be desirable to misalign one or more of the spans 32A, 32B, 32C, 32D at one or more ends of the path 36 to reach beyond a line of site from the support tower 24, which is defined by the horizontal axis 28, or around obstacles, such as trees, fences, and/or the like.

The factors may be determined by the controller 18 in a continuous, real-time fashion as the information is transmitted by the receiver 16 and the plurality of antennas 14A, 14B, 14C, 14D. In various embodiments, the controller 18 is further operable to control the speed of the spans 32A, 32B, 32C, 32D and drive towers 34A, 34B, 34C, 34D as they travel along the path 36 based on one or more of the signals. For instance, the controller 18 may set a speed of each of the drive units 38A, 38B, 38C, 38D to an equal and/or different speeds relative to each other. In the exemplary embodiment, the controller 18 utilizes speeds for each of the drive units 38A, 38B, 38C, 38D that are slightly different to account for a radial distance of the drive units 38A, 38B, 38C, 38D from the center-pivot system with support tower 24.

The controller 18 is operable to individually communicate with the drive units 38A, 38B, 38C, 38D by transmitting control signals of varying frequencies that are receivable by the drive units 38A, 38B, 38C, 38D. The drive units 38A, 38B, 38C, 38D are each assigned to one or more different frequencies, which, when received by one or more of the drive units 38A, 38B, 38C, 38D, cause the drive unit 38A, 38B, 38C, 38D to perform a function. For example, a control signal transmitted by the controller 18 may cause one or more of the drive units 38A, 38B, 38C, 38D to increase, decrease, and/or maintain its rotational speed of the wheel and tire assemblies 40 based on the current position of the spans 32A, 32B, 32C, 32D and drive towers 34A, 34B, 34C, 34D with respect to the horizontal axis 28 and the path 36 that the irrigation system 12 is supposed to follow.

The controller 18 may include processors, microprocessors, microcontrollers, field-programmable gate arrays (FPGAs), similar programmable logic devices, or combinations thereof. The controller 18 may further include data storage components, or memory, such as random-access memory (RAM), read-only memory (ROM), erasable programmable read-only memory (EPROM), and the like, as well as hard drives, compact disc ROM (CDROM) drives, digital video disc (DVD) drives, flash drives, or the like, and combinations thereof. The controller 18 may also include data input devices, such as keypads, keyboards, mice, etc., and data output devices, such as monitors, displays, lighted indicators, printers, and the like. The controller 18 may additionally include ports to receive data from external sources such as hard wired ports to receive electrical data over a wire or cable, or radio-frequency (RF) ports to receive data wirelessly.

The controller 18 may be configured or programmed to execute instructions or operations which may be implemented in hardware, software, firmware, or combinations thereof. In various embodiments, the instructions may be included in a program which may be stored on a computer-readable medium such as RAM, ROM, EPROM, flash memory, a hard-disk drive, a floppy disk, a CD or CDROM or variations thereof, a DVD, a Blu-ray Disc™ (BD), and the like.

In addition to communicating with the drive units 38A, 38B, 38C, 38D, the controller 18 is also operable to individually communicate with the alignment units 42A, 42B, 42C, 42D by transmitting control signals of varying frequencies that are receivable by the alignment units 42A, 42B, 42C, 42D. The alignment units 42A, 42B, 42C, 42D are each assigned to one or more different frequencies, which, when received by one or more of the alignment units 42A, 42B, 42C, 42D, cause the alignment units 42A, 42B, 42C, 42D to perform a function, which is achieved as follows.

Figure 5:
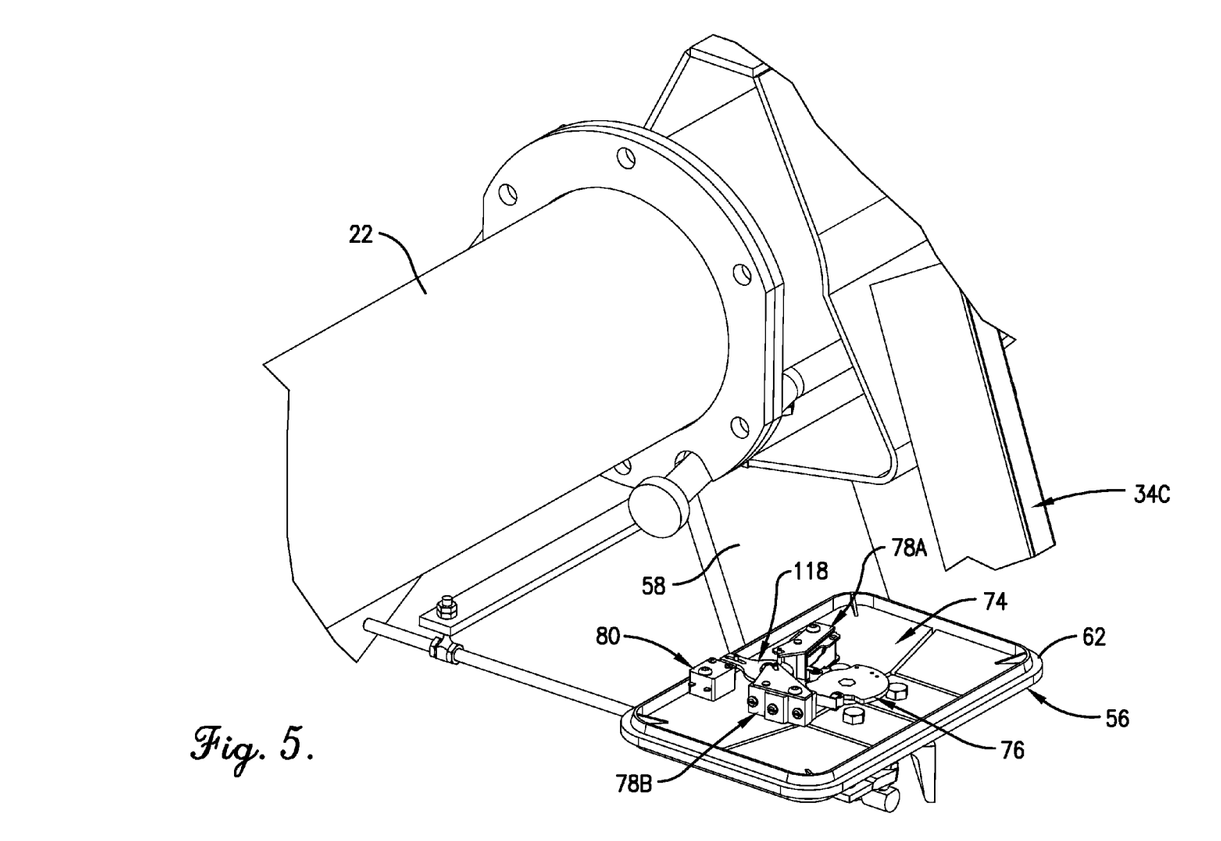
FIG. 5 is a magnified perspective view of the irrigation system of FIG. 1, illustrating a first embodiment of an alignment controller.
Figure 6:
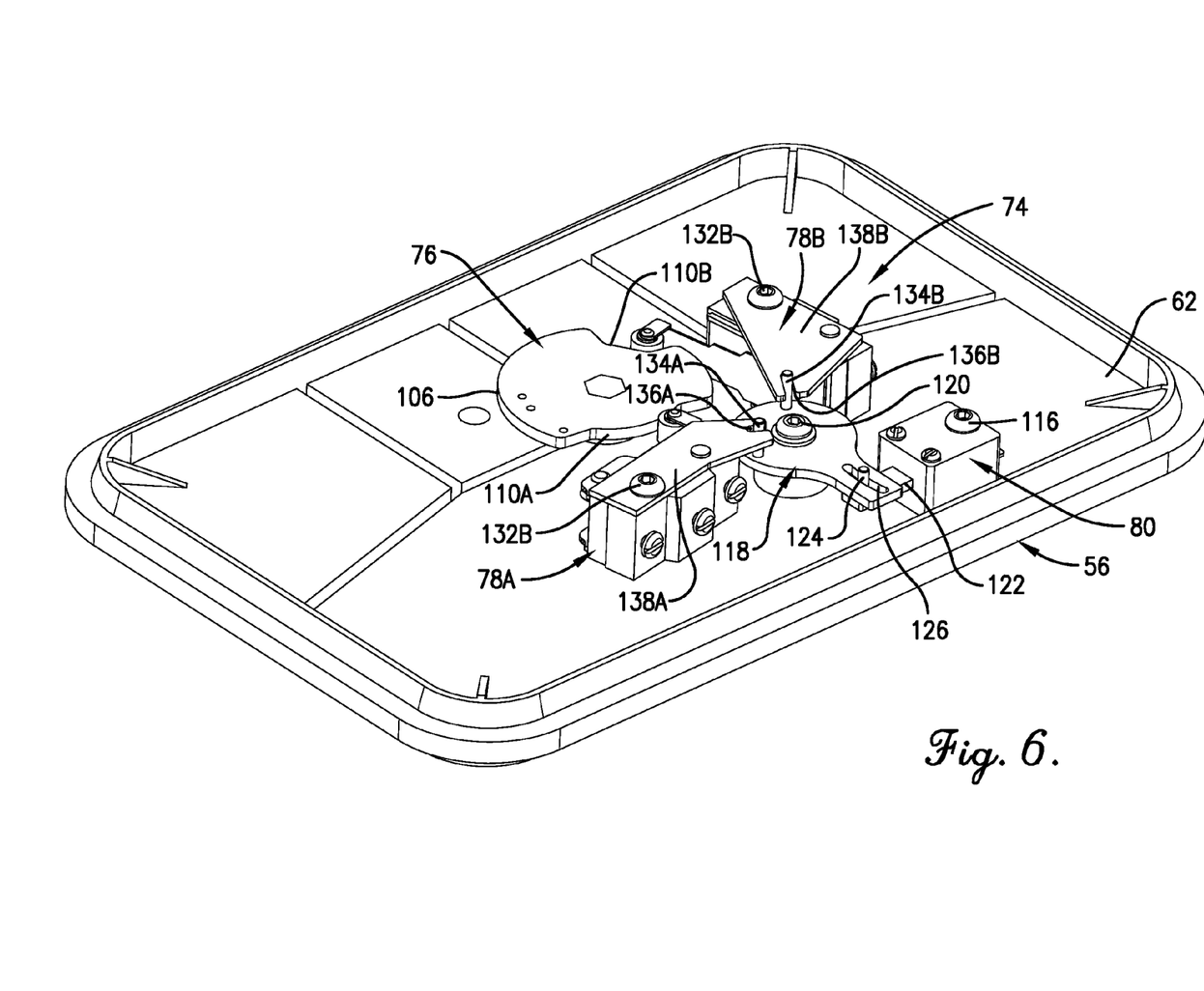
FIG. 6 is a magnified perspective view of the irrigation system of FIG. 1, illustrating the first embodiment of the alignment controller.
Figure 7:
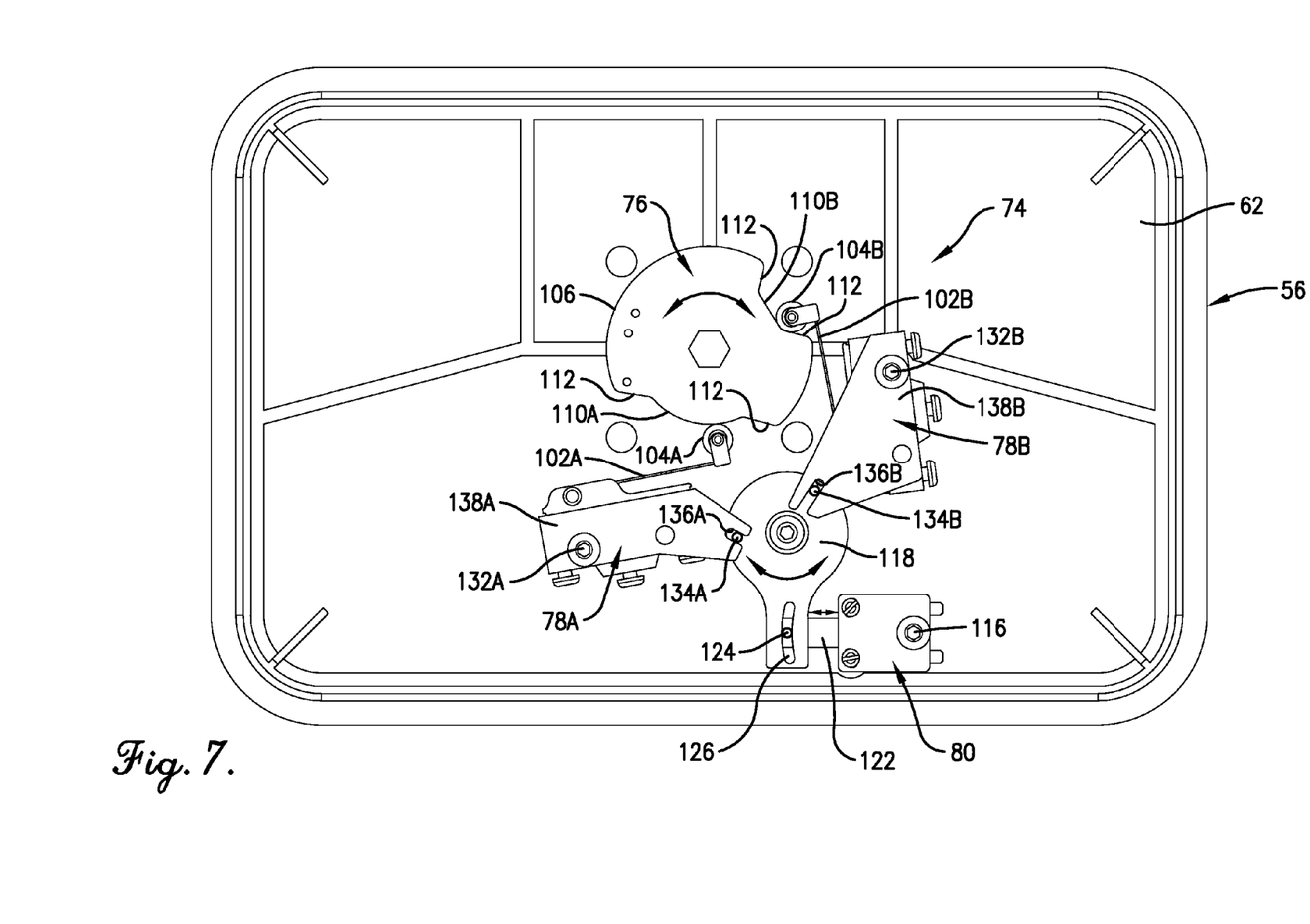
FIG. 7 is a magnified top plan view of the irrigation system of FIG. 1, illustrating the first embodiment of the alignment controller.

Each of the alignment units 42A, 42B, 42C, 42D, as illustrated in FIGS. 4-7 and 9-10, include a housing 56 mounted to a support structure 58 of its respective drive tower 34A, 34B, 34C, 34D. It is foreseen, however, that the housing 56 may be mounted to the pipeline 22 without deviating from the scope of the present invention. The housing 56 includes a cover 60 that is removably secured to a base 62 so that a waterproof seal is formed therebetween upon assembly thereof. Mounted within the housing 56 is an alignment controller 74, which in a first embodiment, as seen in FIGS. 5-7, includes a rotatable cam 76 and a control switch 78A. Also mounted in the housing is a safety switch 78B and an actuator 80.

The cam 76 is connected to and supported by a cam arm 88, which is secured to and supported by a joint 90. The joint 90 is connected to linkage rod 92A and linkage bar 92B, which are connected in series to the pipeline 22 via a collar 98. The collar 98 is spaced away from its respective drive tower 34A, 34B, 34C, 34D along the pipeline 22. In this manner, the collar 98 is operable to move or shift with the pipeline 22 independent of its respective drive tower 34A, 34B, 34C, 34D, which occurs if the pipeline 22 is misaligned with respect to one or more of the drive towers 34A, 34B, 34C, 34D. Any such shifting of the pipeline 22 is communicated from the collar 98 and to the joint 90 via the linkage rod 92A and linkage bar 92B. The joint 90 is operable to convert translational movement to rotational movement. In this manner, the joint 90 rotates the cam arm 88 based on any translational movements of the linkage rod 92A and linkage bar 92B. Rotation of the vertical rod causes the cam 76 to rotate either clockwise or counter-clockwise based on a direction of rotational movement, which depends on whether the collar 98 and the pipeline 22 are shifting away from, toward, and/or twisting with respect to one or more of the drive towers 34A, 34B, 34C, 34D. In this manner, the joint 90, and the linkage rod 92A and linkage bar 92B form an alignment sensor 100 operable to measure a real-time position of each of the drive towers 34A, 34B, 34C, 34D.

The safety switch 78A and the control switch 78B are substantially similar to each other in structure. Each of the switches 78A, 78B includes an arm 102A, 102B, respectively, with a roller 104A, 104B, respectively, attached at an end thereof. The switches 78A, 78B may include two different states or modes—activated and deactivated. The switches 78A, 78B may activate when the arms 102A, 102B and the rollers 104A, 104B are pressed inward to the body of the switch. The switches 78A, 78B may deactivate when the pressure is removed. The safety switch 78A, when activated, deenergizes the drive unit 38 of the span 32 to which the alignment unit 42 is attached. In some embodiments, the entire irrigation system 12 may shut down and an alarm may be triggered when the safety switch 78A is activated. When safety switch 78A is not activated, then no action is taken. The control switch 78B, when activated, energizes the drive unit 38 of the span 32 to which the alignment unit 42 is attached. When switch 78B is not activated, then the local drive unit 38 is deenergized.

The cam 76 may be generally circular with an outer ring 106 about its circumference and may include a safety notch 110A and a control notch 110B, both of which are indentations on the outer ring 106, as best seen in FIG. 7. Both notches 110A, 110B include sidewalls 112 that extend outward from the notch to the outer ring 106. When the spans 32A, 32B, 32C, 32D are aligned and situated in a normal, default setting (on flat, smooth ground with no obstacles), the cam 76, and the switches 78A, 78B may be positioned on the base 62 and oriented such that the roller 104A is positioned near the center of the safety notch 110A and the roller 104B is positioned near the center of the control notch 110B. Thus, the orientation of the switches 78A, 78B with the rollers 104A, 104B being near the center of the notches 110A, 110B determines the default alignment of the associated span 32A, 32B, 32C, 32D.

The angular position of the cam 76 corresponds to the alignment both horizontally and vertically of its associated span 32A, 32B, 32C, 32D. As the alignment of the span 32A, 32B, 32C, 32D changes, the cam 76 rotates correspondingly. When the cam 76 rotates and the rollers 104A, 104B roll from the center of the notch 110A, 110B up the sidewalls 112, the switches 78A, 78B may activate. The distance between the sidewalls 112 for each notch 110A, 110B determines how far from the default alignment the span 32A, 32B, 32C, 32D can travel before the switches 78A, 78B activate.

As seen in FIG. 7, the distance between sidewalls 112 for the control notch 110B is smaller than that of the safety notch 110A. This is because the control notch 110B and the control switch 78B control the normal operation of the irrigation system 12, which allows for each span 32A, 32B, 32C, 32D to travel from the default alignment for a certain distance before the roller 104B rolls up the sidewall 112, activates the switch 78B, and energizes the motor of the associated drive unit 38A, 38B, 38C, 38D. The drive unit 38A, 38B, 38C, 38D then propels the span 32A, 32B, 32C, 32D in the direction of irrigation system 12 travel in order to bring the span 32A, 32B, 32C, 32D back into alignment, at which point the roller 104B rolls down the sidewall 112, deactivates the switch 78B, and deenergizes the motor.

The distance between sidewalls 112 for the safety notch 110A is greater than that of the control notch 110B because each span 32A, 32B, 32C, 32D is allowed to travel a greater distance from default alignment before there is a safety issue. For example, a span 32A, 32B, 32C, 32D may travel from its default alignment until the cam 76 rotates and activates the control switch 78B. The associated drive unit 38A, 38B, 38C, 38D may then be energized. If the motor delays in turning on, then the cam 76 may rotate a little farther. This is acceptable as long as the motor turns on and brings the span 32A, 32B, 32C, 32D back into alignment. However, if the motor fails to turn on, then the cam 76 continues to rotate until the safety switch 78A is activated, at which point the irrigation system 12 may be halted. Or, if a span 32A, 32B, 32C, 32D falls quickly and far out of alignment (indicating that a span 32 has gotten stuck, tipped over, or otherwise become incapacitated), then not only is the control switch 78B activated but the safety switch 78A is also activated, which may halt the irrigation system 12.

There may be situations in which the default alignment may change from its normal settings described above. For example, the irrigation system 12 may be implemented in an environment that is not flat such that for at least a portion of their travel the spans 32A, 32B, 32C, 32D traverse a hill or slope. In such a situation, the cam 76 of the alignment unit 42 for a particular span 32 may be rotated slightly from its default flat ground position when the span 32 is on a hill but generally radially aligned with the other spans 32. Or, the environment may be generally flat, but at least one span 32A, 32B, 32C, 32D has to travel in a gulley or some other uneven surface. Alternatively, the environment may be flat and smooth, but there may be one or more obstacles, such as trees, buildings, etc., in the path of the spans 32A, 32B, 32C, 32D. In situations such as these, the system 10 may not only adjust the default alignment for each span 32A, 32B, 32C, 32D, but may also adjust the default alignment at any time.

The switches 78A, 78B may be oriented on the base 62 with fasteners 132A, 132B, respectively, such that each switch 78A, 78B may rotate about the central axis of its respective fastener 132. In addition, each switch 78A, 78B may include a cover plate 138A, 138B, respectively, with a slot 136A, 136B, respectively. There may be a reorienting disc 118 mounted on the base 62 with a fastener 120 that includes upward standing posts 134A, 134B. The post 134A may engage the slot 136A of the safety switch 78A. The post 134B may engage the slot 136B of the control switch 78B. The reorienting disc 118 may also include a slot 126 intended to couple with the actuator 80. The actuator 80 may include an arm 122 and an upward standing post 124 attached thereto and engaging the slot 126. The arm 122 may be operable to extend from and retract into the actuator 80. The extension and retraction of the arm 122 generally urges the reorienting disc 118 to rotate about the fastener 120, as indicated in FIG. 7. Typically, extension of the arm 122 rotates the reorienting disc 118 in a first direction, and retraction of the arm 122 rotates the reorienting disc 118 in a second, opposite direction. Rotation of the reorienting disc 118 in turn causes the switches 78A, 78B to simultaneously pivot about pivot points defined by fasteners 132A, 132B. As the switches 78A, 78B pivot, the rollers 104A, 104B pivot and contact the notches 110A, 110B in different positions. It is important that the switches 78A and 78B pivot to the appropriate point in order to maintain the distinct and accurate functioning of both the safety switch 78A and the control switch 78B.

The controller 18 may send a signal to the alignment unit 42A, 42B, 42C, 42D to extend or retract the arm 122 of the actuator 80. The signal may be sent in anticipation of one or more spans 32A, 32B, 32C, 32D encountering an unusual or varying setting (slopes, gulleys, obstacles, etc.). Thus, the default alignment of the span 32A, 32B, 32C, 32D may change, in turn changing the default angular position of the cam 76. Accordingly, the arm 122 may be actuated and the reorienting disc 118 rotated such that the contact point of the rollers 104A, 104B with the notches 110A, 110B is still near the center of the notches 110A, 110B.

Figures 8, 9:
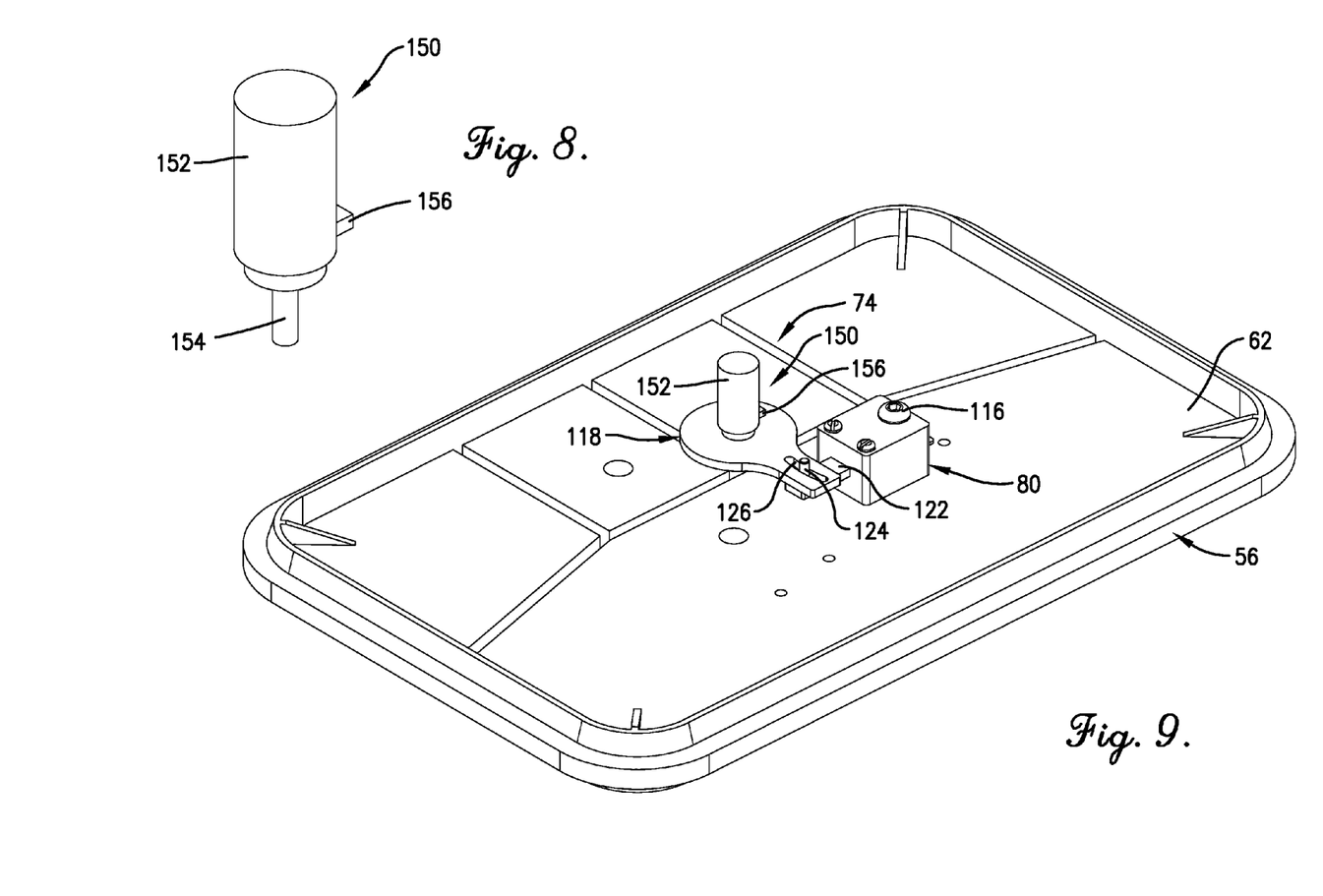
FIG. 8 is a perspective view of a variable control unit.
FIG. 9 is a magnified perspective view of the irrigation system of FIG. 1, illustrating a second embodiment of the alignment controller.
Figure 10:
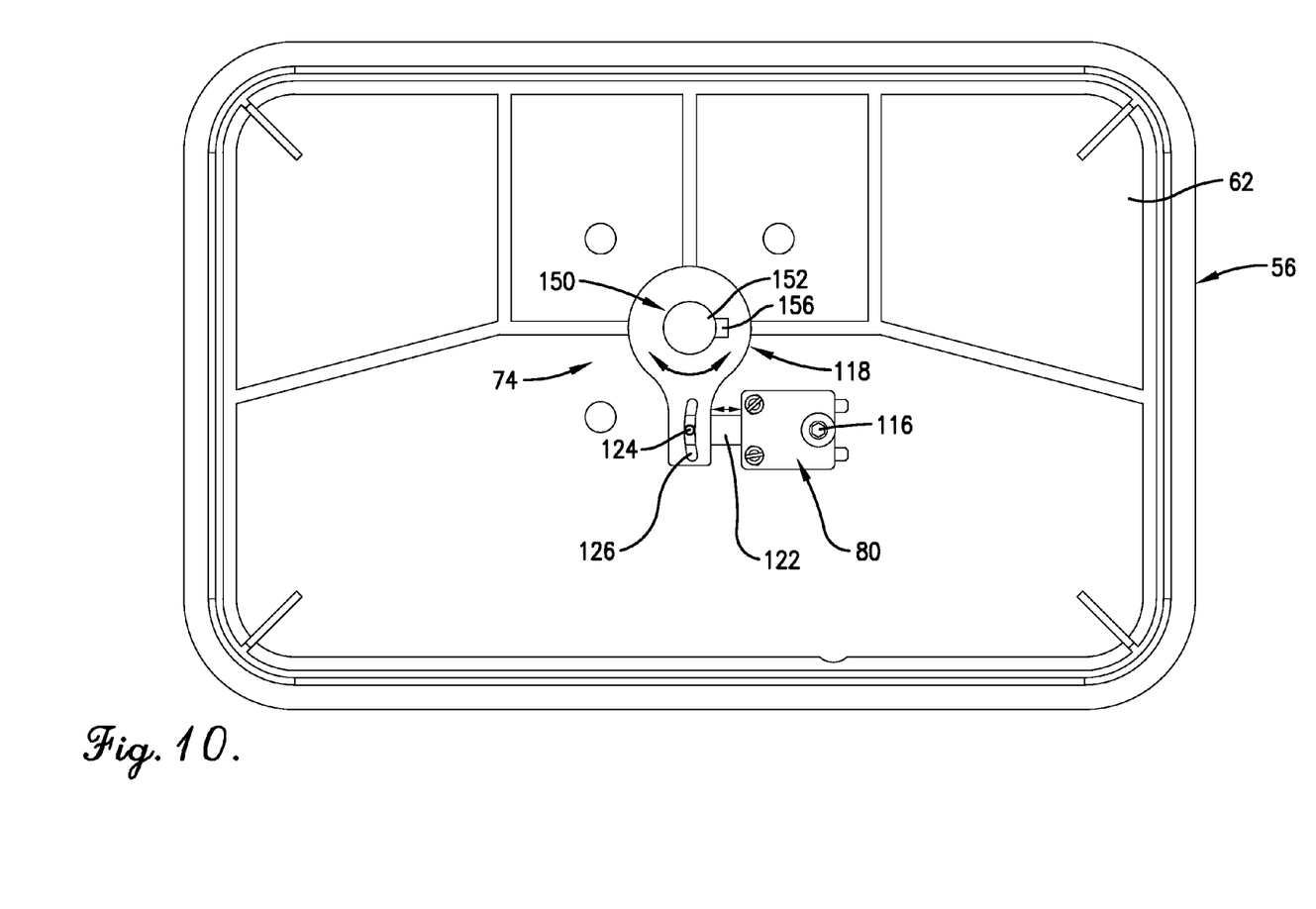
FIG. 10 is a magnified top plan view of the irrigation system of FIG. 1, illustrating the second embodiment of the alignment controller.
Figure 11:
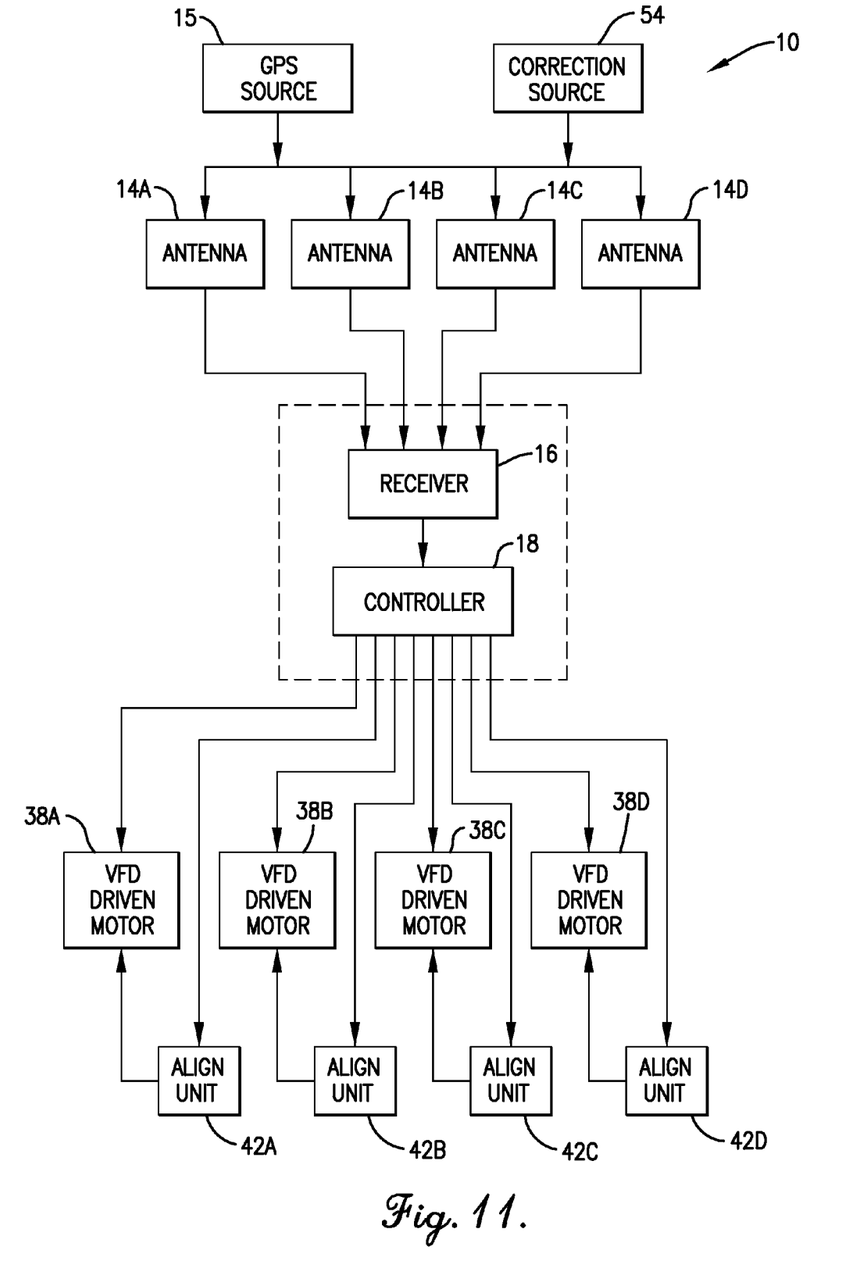
FIG. 11 is a schematic block diagram of the irrigation system of FIG. 1.

A second embodiment of the alignment controller 74 is shown in FIGS. 8-10, and may include a variable control unit 150. The variable control unit 150 may include a body 152, a shaft 154, and an electrical output 156, as seen in FIG. 8. The body 152 may be roughly cylindrical and may couple to the reorienting disc 118. The shaft 154 may be similar in structure and function to the cam arm 80 and may protrude from one end of the body 152. The shaft 154 may couple directly to the joint 90 and indirectly to the linkage rod 92A and linkage bar 92B. Examples of the variable control unit 150 include a rotary potentiometer whose resistance depends on the angular position of the shaft 154, an analog or digital encoder, or the like. The electrical output 156 may include a level, such as a resistance, a voltage, a current, or a digital value, that corresponds to the angular position of the shaft 154.

The variable control unit 150 may be positioned in the same location on the base 62 as the cam 76 was in the first embodiment. The reorienting disc 118 may be mounted to the base 62 such that the reorienting disc 118 is rotatable about an axis along the shaft 154 of the variable control unit 150. The variable control unit 150 may be oriented such that the shaft 154 is at a central angle of rotational travel and coupled to the joint 90 when the spans 32A, 32B, 32C, 32D are aligned and situated in a normal, default setting. Thus, the shaft 154 of the variable control unit 150 functions very similarly to the cam 76 of the first embodiment. Changes in the alignment of the associated span 32A, 32B, 32C, 32D changes the rotation of the shaft 154 of the variable control unit 150 and in turn, the electrical output 156. The electrical output 156 may be utilized to energize and deenergize the associated drive unit 38A, 38B, 38C, 38D, similar to the function of the control switch 78B, as discussed above. For example, a small, first range of angular rotations for the shaft 154 about the central default angle may be similar in function to the control notch 110B of the cam 76. The first range of angular rotations may correspond to a first range of values of the electrical output 156. The output 156 may be a range of resistances, voltages, currents, or digital values. When the shaft 154 rotates beyond the first range of angles, then the electrical output 156 reflects that rotation and may be used to energize the associated drive unit 38A, 38B, 38C, 38D until the shaft 154 rotates to be within the first range of angles. Furthermore, the electrical output 156 may be used to perform the safety switch 78A function as well. A larger, second range of angular rotations for the shaft 154 about a central default angle may be similar in function to the safety notch 110A of the cam 76. If the shaft 154 is rotated beyond the second range of angles, then the irrigation system 12 may be halted.

In some embodiments of the system 10, the electrical output 156 of the variable control unit 150 may be utilized to control the output speed of a variable output motor of the drive units 38A, 38B, 38C, 38D. The system 10 may be configured such that when the span 32A, 32B, 32C, 32D is very close to its default alignment and the shaft 154 is near the center of its rotational travel, then the electrical output 156 may be at a default level and the speed of the associated drive unit 38A, 38B, 38C, 38D may be at or near zero. If the span 32A, 32B, 32C, 32D goes farther out of alignment, then the electrical output 156 may change accordingly, which may be used to increase the speed of the associated drive unit 38A, 38B, 38C, 38D in order to bring the span 32A, 32B, 32C, 32D back into alignment. As the span 32A, 32B, 32C, 32D returns into alignment, the electrical output 156 returns to near its default level, and the speed of the associated drive unit 38A, 38B, 38C, 38D returns to zero or near zero.

When the default alignment of any of the spans 32A, 32B, 32C, 32D needs to be changed, the system 10 may function substantially similarly to what is described above. When the default alignment of the span 32A, 32B, 32C, 32D changes in response to changing environmental conditions, the default angular position of the joint 90 and in turn the shaft 154 of the variable control unit 150 may change. The controller 18 may send a signal to the alignment unit 42A, 42B, 42C, 42D to extend or retract the arm 122 of the actuator 80, as indicated in FIG. 10. Accordingly, the reorienting disc 118 may rotate the body 152 of the variable control unit 150 such that the center of rotational travel of the shaft 154 aligns with the default angular position of the joint 90. With this change, the control and safety functions should operate normally.

The guidance control system 10 and irrigation system 12, as shown in FIGS. 1 and 2, may function as follows. The lead span 32D may be driven as needed according to the irrigation requirements. For example, the irrigation area may require irrigation at half of the maximum capacity of the irrigation system 12. Thus, drive unit 38D may be energized for 30 seconds of every minute and then deenergized for 30 seconds. The irrigation system 12 may be driven in a clockwise direction or a counterclockwise direction, where either direction may be considered forward or reverse. The direction shown in FIGS. 1 and 2 may be considered forward. As the lead span 32D is propelled forward, the alignment unit 42C senses a change in alignment. Utilizing the first embodiment of the alignment controller 74, the cam 76 (best seen in FIG. 7) of the alignment unit 42C may rotate in a first direction in response to the motion of the lead span 32D. When the cam 76 rotates to an extent that the roller 104B encounters the sidewall 112, the control switch 78B may be activated—thereby energizing the drive unit 38C. Drive unit 38C propels the lag span 32C and the drive tower 34C forward to move into alignment with the lead span 32D. While drive tower 34C is moving forward, the cam 76 of the alignment unit 42C is rotating in a second direction, opposite to the first direction. When the cam 76 rotates enough, the roller 104B rolls off of the sidewall 112 and the control switch 78B deactivates—thereby deenergizing drive unit 38C. This start and stop motion of the lag span 32C may continue as the lead span 32D slowly moves forward and causes a misalignment that is sensed by the alignment unit 42C. The drive unit 38C is energized only enough to bring the lag span 32C back into alignment with the lead span 32D and then the drive unit 38C is shut off until the point when the alignment unit 42C senses another misalignment and the process repeats.

Propulsion of the lead span 32D and the first lag span 32C may have a chain reaction effect on the other lag spans 32B, 32A. The drive unit 38C may start and stop a few times before a misalignment is sensed by the alignment unit 42B. Drive unit 38B may then be energized, propelling the drive tower 34B and the lag span 32B forward until the lag span 32B is aligned with the lag span 32C, at which point the drive unit 38B may be deenergized. This process may continue with the lag span 32B attempting to realign with the lag span 32C, which is, in turn, trying to align with the lead span 32D. In a similar fashion, the alignment unit 42A may sense the misalignment between the lag span 32A and the lag span 32B and, in response, may energize the drive unit 38A until the two spans 32A, 32B are aligned. Thus, each span 32A, 32B, 32C aligns itself only to the adjacent span that is radially outward. For example, the span 32A aligns itself to the span 32B, but not to the span 32C or the span 32D.

In certain situations, a safety issue may arise. For example, the drive unit 38C may fail to operate. Under normal circumstances, the lead span 32D moves forward, causing the cam 76 of the alignment unit 42C to rotate in a first direction, which activates the control switch 78B and energizes the drive unit 38C to correct the misalignment. In this situation, the lead span 32D may continue to be propelled forward, thereby causing the cam 76 of the alignment unit 42C to continue to rotate in the first direction until the roller 104A encounters the sidewall 112 and activates the safety switch 78A. Activation of the safety switch 78A may halt the entire system 12 and may trigger an alarm.

When the irrigation system 12 is implemented in a non-ideal environment (e.g., the presence of hills, gulleys, obstacles, etc.), the default alignment settings of one or more of the alignment units 42A, 42B, 42C, 42D may need to be adjusted one or more times. The controller 18 may send a signal to the actuator 80 of the appropriate alignment unit 42A, 42B, 42C to rotate the reorienting disc 118. The orientations of the safety switch 78A and the control switch 78B with respect to the cam 76 may be changed as a result. This allows the appropriate span 32A, 32B, 32C, 32D or spans 32 to operate normally even if they are tilted at an angle due to a hill or rotated forward or backward to avoid an obstacle. The controller 18 may address any alignment unit 42A, 42B, 42C, 42D at any time to change the orientation of the switches 78A, 78B and thereby, the default alignment of the associated span 32A, 32B, 32C, 32D. Often, the controller 18 sends a signal to one or more alignment units 42A, 42B, 42C, 42D to reorient the switches 78A, 78B to accommodate a change in the environment, and then sends a signal to return the switches 78A, 78B to their original orientation when the change in environment has passed.

In order for the controller 18 to determine when to send a signal to the alignment units 42A, 42B, 42C, 42D to reorient the switches 78A, 78B, the controller 18 may receive input from the antennas 14A, 14B, 14C, 14D through the receiver 16. The antennas 14A, 14B, 14C, 14D may supply the controller 18 with accurate information about the position (e.g., latitude and longitude) of the drive tower 34 of each span 32A, 32B, 32C, 32D. With a priori knowledge of the terrain (hills, gulleys, obstacles, etc.) over which the irrigation system 12 travels, the controller 18 may determine when each span 32A, 32B, 32C, 32D is going to encounter a change in environment and may send a signal to the appropriate alignment unit 42A, 42B, 42C, 42D to reorient the switches 78A, 78B at the appropriate time. For example, the terrain may include a small hill that only the drive tower 34B encounters at a given latitude and longitude. Given input from the antenna 14B and the receiver 16, the controller 18 may determine when the drive tower 34B is going to be at the given latitude and longitude and may send a signal to the alignment unit 42B to reorient the switches 78A, 78B to the proper position to accommodate the change in alignment caused by the hill. When the drive tower 34B has cleared the hill, as indicated by the antenna 14B, the controller 18 may send a signal to the alignment unit 42B to return the switches 78A, 78B to their original position.

When utilizing the second embodiment of the alignment controller 74, the guidance control system 10 and irrigation system 12 may function in a similar fashion as described above, with exceptions noted as follows. Change in the alignment, either vertical or horizontal, of a span 32A, 32B, 32C, 32D generally causes a rotation of the shaft 154 of the variable control unit 150. The electrical output 156 of the variable control unit 150 may be utilized to either start and stop a motor of the drive units 38A, 38B, 38C, 38D or to vary the speed of a motor of the drive units 38A, 38B, 38C, 38D.

As each span 32A, 32B, 32C, 32D moves in and out of alignment, the shaft 154 of each associated variable control unit 150 rotates. The shaft 154 may rotate in either direction away from a central default angle that represents alignment. There may be a first range of angles of shaft 154 rotation that are similar to the control notch 110B of the cam 76 for which the drive units 38A, 38B, 38C, 38D are not energized. Once the shaft 154 rotates outside of the first range, then the appropriate drive unit 38A, 38B, 38C, 38D is energized, propelling the associated span 32A, 32B, 32C, 32D into alignment. At such a point, the shaft 154 rotates back into the first range of angles and the drive unit 38A, 38B, 38C, 38D is deenergized. Furthermore, a second range of angles of shaft 154 rotation, larger than the first range, may provide the safety function, wherein if the shaft 154 rotates outside of the second range, then the irrigation system 12 may be halted and an alarm may be triggered.

In embodiments of the irrigation system 12 that include drive units 38A, 38B, 38C, 38D with motors whose output speed can be controlled, the electrical output 156 of the variable control unit 150 may be used to vary the speed. The electrical output 156 may include a range of values of resistance, voltage, current, or digital numerical values. Generally, the middle value of the range may be considered the value at which the associated span 32A, 32B, 32C, 32D is in alignment. Thus, the corresponding speed of the associated drive unit 38A, 38B, 38C, 38D may be zero or near zero. As a span 32A, 32B, 32C, 32D is pulled out of alignment, the shaft 154 of the associated variable control unit 150 is rotated away from the central default angle and the electrical output 156 changes from its central value. Each value of the electrical output 156 away from its central value may represent an increase in drive unit 38A, 38B, 38C, 38D speed. Thus, the farther out of alignment a particular span 32A, 32B, 32C, 32D is, the faster it tries to return to alignment.

Whether the second embodiment of the alignment controller 74 is used to start and stop a drive unit 38A, 38B, 38C, 38D or control the speed of a drive unit 38A, 38B, 38C, 38D, the default alignment setting of the second embodiment of the alignment controller 74 may be adjusted in the same fashion as discussed above for the first embodiment. The controller 18 may send a signal to the actuator 80 of the appropriate alignment unit 42A, 42B, 42C to rotate the reorienting disc 118. This action in turn rotates the body 152 of the variable control unit 150, but not the shaft 154. Thus, the central default angle of the variable control unit 150 with respect to the joint 90, the linkage rod 92A, and linkage bar 92B is changed. The change in the central default angle generally compensates for the change in the positions of the joint 90, the linkage rod 92A, and linkage bar 92B due to the particular span 32A, 32B, 32C, 32D encountering a hill or an obstacle. Once the hill or obstacle is passed, the controller 18 may send a signal to the actuator 80 of the appropriate alignment unit 42A, 42B, 42C to rotate the reorienting disc 118 and return the angle indication element 150 to its original orientation angle.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An alignment unit to control an irrigation system drive tower carrying a linear pipeline along a path, the alignment unit comprising: a housing affixed to the drive tower or the linear pipeline; an alignment sensor operable to measure a real-time alignment of the drive tower; an alignment controller in communication with the alignment sensor, the alignment controller operable to receive the real-time alignment of the drive tower and energize a drive unit based on a first range of real-time alignment values, the alignment controller including a cam coupled to the alignment sensor which rotates in response to changes in the real-time alignment, the cam including a control notch and a safety notch; a safety switch with a roller coupled to the cam such that when the roller does not contact the safety the drive unit is deenergized; an actuator in communication with the alignment controller, the actuator operable to reorient at least a portion of the alignment controller in relation to the alignment sensor; and a reorienting disc coupled to the alignment controller and the safety switch and rotated by the actuator, wherein rotation of the reorienting disc changes the orientation of the alignment controller and the safety switch.

2. The alignment unit according to claim 1, wherein the control notch has a first width that corresponds to the first range of real-time alignment values and the safety notch has a second width that corresponds to a second range of real-time alignment values, wherein the first width is less than the second width.

3. The alignment unit according to claim 1, wherein the actuator reorients the control switch in relation to the alignment sensor.

4. The alignment unit according to claim 1, further including a safety switch, wherein the actuator is further operable to reorient the safety switch in relation to the cam simultaneously with reorienting the control switch.

5. The alignment unit according to claim 1, wherein the alignment controller further includes a variable control unit with a variable electric output whose value corresponds to the real-time alignment of the drive tower.

6. The alignment unit according to claim 5, wherein the variable control unit includes a shaft coupled to the alignment sensor and a body operable to be rotated by the actuator.

* * * * *